(12) United States Patent
Ricatto et al.

(10) Patent No.: US 6,923,890 B2
(45) Date of Patent: Aug. 2, 2005

(54) CHEMICAL PROCESSING USING NON-THERMAL DISCHARGE PLASMA

(75) Inventors: Pascal J. Ricatto, Ridgewood, NJ (US); Edward J. Houston, East Brunswick, NJ (US); Richard Crowe, Hazlet, NJ (US)

(73) Assignee: PlasmaSol Corporation, Hoboken, NJ (US)

( * ) Notice: Subject to any disclaimer, the term of this patent is extended or adjusted under 35 U.S.C. 154(b) by 95 days.

(21) Appl. No.: 10/211,980

(22) Filed: Aug. 2, 2002

(65) Prior Publication Data

US 2003/0051993 A1 Mar. 20, 2003

Related U.S. Application Data

(63) Continuation-in-part of application No. 09/738,923, filed on Dec. 15, 2000.
(60) Provisional application No. 60/171,198, filed on Dec. 15, 1999, provisional application No. 60/171,324, filed on Dec. 21, 1999, provisional application No. 60/309,530, filed on Aug. 2, 2001, and provisional application No. 60/358,340, filed on Feb. 19, 2002.

(51) Int. Cl.[7] .................. D06M 11/00; C01G 15/12; C01B 3/24; B01J 19/08
(52) U.S. Cl. .............. 204/164; 8/115.51; 8/115.52; 204/165; 208/46; 423/650; 423/655
(58) Field of Search .............. 8/115.51, 115.52; 204/164, 165; 208/46; 423/650, 655

(56) References Cited

U.S. PATENT DOCUMENTS 3,594,065 A  7/1971  Marks
4,698,551 A  10/1987  Hoag ................. 313/619

(Continued)

FOREIGN PATENT DOCUMENTS

EP  1 084 713 A1  3/2001
EP  1 378 253 A1  1/2004

OTHER PUBLICATIONS

Kolman et al., "Genotoxic effects of ethylene oxide, propylene oxide and epinchlorohydrin in humans: update review" (1990–2000), Mutation Research 512 (2002) 173–194.

(Continued)

*Primary Examiner*—Stanley S. Silverman
*Assistant Examiner*—Maribel Medina
(74) *Attorney, Agent, or Firm*—Darby & Darby

(57) ABSTRACT

A method for activating chemical reactions using a non-thermal capillary discharge plasma (NT-CDP) unit or a non-thermal slot discharge plasma (NT-SDP) unit (collectively referred to as "NT-CDP/SDP"). The NT-CDP/SDP unit includes a first electrode disposed between two dielectric layers, wherein the first electrode and dielectric layers having at least one opening (e.g., capillary or a slot) defined therethrough. A dielectric sleeve inserted into the opening, and at least one second electrode (e.g., in the shape of a pin, ring, metal wire, or tapered metal blade) is disposed in fluid communication with an associated opening. A non-thermal plasma discharge is emitted from the opening when a voltage differential is applied between the first and second electrodes. Chemical feedstock to be treated is then exposed to the non-thermal plasma. This processing is suited for the following exemplary chemical reactions as (i) partial oxidation of hydrocarbon feedstock to produce functionalized organic compounds; (ii) chemical stabilization of a polymer fiber (e.g., PAN fiber precursor in carbon fiber production; (iii) pre-reforming of higher chain length petroleum hydrocarbons to generate a feedstock suitable for reforming; (iv) natural gas reforming in a chemically reducing atmosphere (e.g., ammonia or urea) to produce carbon monoxide and Hydrogen gas; or (v) plasma enhanced water gas shifting.

16 Claims, 4 Drawing Sheets

U.S. PATENT DOCUMENTS

| | | | |
|---|---|---|---|
| 4,885,074 A | 12/1989 | Susko et al. ............... 204/298 |
| 5,033,355 A | 7/1991 | Goldstein et al. ............... 89/8 |
| 5,062,708 A | 11/1991 | Liang et al. ............... 356/316 |
| 5,084,239 A | 1/1992 | Moulton et al. |
| 5,115,166 A | 5/1992 | Campbell et al. |
| 5,178,829 A | 1/1993 | Moulton et al. |
| 5,184,046 A | 2/1993 | Campbell |
| 5,186,893 A | 2/1993 | Moulton et al. |
| 5,288,460 A | 2/1994 | Caputo et al. |
| 5,325,020 A | 6/1994 | Campbell et al. |
| 5,376,332 A | 12/1994 | Martens et al. |
| 5,387,842 A | 2/1995 | Roth et al. |
| 5,408,160 A | 4/1995 | Fox |
| 5,413,758 A | 5/1995 | Caputo et al. |
| 5,413,759 A | 5/1995 | Campbell et al. |
| 5,413,760 A | 5/1995 | Campbell et al. |
| 5,414,324 A | 5/1995 | Roth et al. |
| 5,472,664 A | 12/1995 | Campbell et al. |
| 5,476,501 A | 12/1995 | Stewart et al. ............... 607/127 |
| 5,482,684 A | 1/1996 | Martens et al. |
| 5,498,526 A | 3/1996 | Caputo et al. |
| 5,593,550 A | 1/1997 | Stewart et al. ............... 204/164 |
| 5,593,649 A | 1/1997 | Fisher et al. |
| 5,594,446 A | 1/1997 | Vidmar et al. ............... 342/1 |
| 5,603,895 A | 2/1997 | Martens et al. |
| 5,620,656 A | 4/1997 | Wensky et al. |
| 5,637,198 A | 6/1997 | Breault ............... 204/165 |
| 5,645,796 A | 7/1997 | Caputo et al. |
| 5,650,693 A | 7/1997 | Campbell et al. |
| 5,667,753 A | 9/1997 | Jacobs et al. |
| 5,669,583 A | 9/1997 | Roth |
| 5,686,789 A | 11/1997 | Schoenbach et al. |
| 5,695,619 A | 12/1997 | Williamson et al. ............... 204/165 |
| 5,753,196 A | 5/1998 | Martens et al. |
| 5,872,426 A | 2/1999 | Kunhardt et al. ............... 313/582 |
| 5,939,829 A | 8/1999 | Schoenbach et al. |
| 6,005,349 A | 12/1999 | Kunhardt et al. ............... 315/111.21 |
| 6,007,742 A | 12/1999 | Czernichowski et al. ... 252/372 |
| 6,027,616 A | 2/2000 | Babko-Malyi ............... 204/164 |
| 6,146,724 A | 11/2000 | Roth |
| 6,147,452 A | 11/2000 | Kunhardt et al. ............... 313/582 |
| 6,170,668 B1 | 1/2001 | Babko-Malyi ............... 209/127.1 |
| 6,232,723 B1 | 5/2001 | Alexeff |
| 6,245,126 B1 | 6/2001 | Feldman et al. ............... 95/59 |
| 6,245,132 B1 | 6/2001 | Feldman et al. ............... 96/28 |
| 6,255,777 B1 | 7/2001 | Kim et al. |
| 6,322,757 B1 | 11/2001 | Cohn et al. ............... 422/186.04 |
| 6,325,972 B1 | 12/2001 | Jacobs et al. |
| 6,333,002 B1 | 12/2001 | Jacobs et al. |
| 6,365,112 B1 | 4/2002 | Babko-Malyi et al. |
| 6,372,192 B1 | 4/2002 | Paulauskas et al. ............... 423/447.1 |
| 6,375,832 B1 | 4/2002 | Eliasson et al. ............... 208/141 |
| 6,383,345 B1 | 5/2002 | Kim et al. |
| 6,395,197 B1 | 5/2002 | Detering et al. ............... 252/373 |
| 6,399,159 B1 | 6/2002 | Grace et al. ............... 427/536 |
| 6,433,480 B1 | 8/2002 | Stark et al. |
| 6,451,254 B1 | 9/2002 | Wang et al. |
| 6,458,321 B1 | 10/2002 | Platt, Jr. et al. |
| 6,475,049 B2 | 11/2002 | Kim et al. |
| 6,497,839 B1 | 12/2002 | Hasegawa et al. |
| 6,509,689 B1 | 1/2003 | Kim et al. |
| 6,545,411 B1 | 4/2003 | Kim et al. |
| 6,548,957 B1 | 4/2003 | Kim et al. |
| 6,570,172 B2 | 5/2003 | Kim et al. |
| 6,580,217 B2 | 6/2003 | Kim et al. |
| 6,589,481 B1 | 7/2003 | Lin et al. |
| 6,599,471 B2 | 7/2003 | Jacobs et al. |
| 6,627,150 B1 | 9/2003 | Wang et al. |
| 6,632,323 B2 | 10/2003 | Kim et al. |
| 6,673,522 B2 | 1/2004 | Kim et al. |
| 6,685,523 B2 | 2/2004 | Kim et al. |
| 2002/0011203 A1 | 1/2002 | Kim |
| 2002/0011770 A1 | 1/2002 | Kim et al. |
| 2002/0045396 A1 | 4/2002 | Kim |
| 2002/0092616 A1 | 7/2002 | Kim |
| 2002/0105259 A1 | 8/2002 | Kim |
| 2002/0105262 A1 | 8/2002 | Kim |
| 2002/0122896 A1 | 9/2002 | Kim et al. |
| 2002/0124947 A1 | 9/2002 | Kim |
| 2002/0126068 A1 | 9/2002 | Kim et al. |
| 2002/0127942 A1 | 9/2002 | Kim et al. |
| 2002/0139659 A1 | 10/2002 | Yu et al. |
| 2002/0144903 A1 | 10/2002 | Kim et al. |
| 2002/0148816 A1 | 10/2002 | Jung et al. |
| 2002/0187066 A1 | 12/2002 | Yu et al. |
| 2003/0003767 A1 | 1/2003 | Kim et al. |
| 2003/0015505 A1 | 1/2003 | Yu et al. |
| 2003/0035754 A1 | 2/2003 | Sias et al. |
| 2003/0048240 A1 | 3/2003 | Shin et al. |
| 2003/0048241 A1 | 3/2003 | Shin et al. |
| 2003/0062837 A1 | 4/2003 | Shin et al. |
| 2003/0070760 A1 | 4/2003 | Kim et al. |
| 2003/0071571 A1 | 4/2003 | Yu et al. |
| 2003/0085656 A1 | 5/2003 | Kundardt et al. |
| 2003/0127984 A1 | 7/2003 | Kim et al. |
| 2003/0134506 A1 | 7/2003 | Kim et al. |
| 2003/0141187 A1 | 7/2003 | Sohn et al. |

OTHER PUBLICATIONS

Schoenbach et al., "Special Issue on Nonthermal Medical/Biological Treatments Using Electromagnetic Fields and Ionized Gasses", IEEE Transactions on Plasma Science, vol. 28, No. 1, Feb. 2000.

Jacobs, "Sterrad 100S" Sterilization System; Advanced Sterilization products a Johnson & Johnson Company, 1999 Advanced Sterilization Products.

Sharpless et al. "International of Organophosphonates with $O(^3P)$, $N(^4S)$, $)2(a' g)$, and $O_3$", Non–Thermal Plasma Techniques or Pollution control, Nato ASI Series, vol. G 34,Part A, p. 123–137 (1993).

Paur, "Removal of Volatile Hydrocarbons From Industrial Off–Gas", Non–Thermal Plasma Techniques for Pollution Control Nato ASI Series, vol. G34 Part B, p. 77–89 (1993).

Mizuno et al. "Application of Corona Technology in the Reduction of Greenhouse gases and Other Gaseous Pollutants", Non–Thermal Plasma Techniques for Pollution Control, Nato ASI Series vol. G34 Part B. 165–185 (1993).

Yamamoto et al., "Decomposition of Volatile Organic Compounds By a Packed–Bed Reactor and a Pulsed–Corona Plasma Reactor", Non–Thermal Plasma Techniques for Pollution Control, Nato ASI Series, vol. G34, Part B, p. 223–237 (1993).

Rosocha et al., Treatment of Hazardous Organic Wastes Using Silent Discharge Plasmas, Non–Thermal Plasma Techniques for Pollution Control, Nato ASI Series vol. G34 Part B, p. 281–308 (1993).

International Search Report.

Vidmar, R.J., "On the Use of Atmospheric Pressure Plasma as Electromagnetic Reflectors and Absorbers", *IEEE Transactions on Plasma Science*, vol. 18 No. 4, Aug. 1990.

Kunhardt, E.E., "Generation of Large–Volume, Atmosphereic–Pressure, Nonequilibrium Plasmas", *IEEE Transactions on Plasma Science*, vol. 28, No. 1, pp. 189–200, Feb. 2000.

Penetrante et al., "Non–Thermal Plasma Techniques for Abatement of Violatile Organic Compounds and Nitrogen Oxides", *INP Report XIII*, pp. 18–46 (1996).

Chen D.C.C., Lawton, J., and Weinberg, F.K., *Tenth Symposium on Combustion*, pp. 743–754 (1965).

Tarnovsky, V. and Becker, K., *Plasma Sources Science and Technology*, vol. 4, No. 307 (1995).

Knight, Henry de Boyne, the Arc Discharge; its application to power control, *London Chapman & Hall*(1960).

L.A. Rosenthal and D. A. Davis, "Electrical Characterization of a Corona Discharge for Surface Treatment", *IEEE Transaction on Industry Applications*, vol. 1A–11, No. 3, pp. 328–335 (May/Jun. 1975).

S. Han, Y. Lee, H. Kim, J. Lee, J. Yoon, and G. Kim, "Polymer Surface Modification by Plasma Source Ion Implantation", *Surfaces and Coatings Technology*, vol. 93, pp. 261–264 (1997).

Babko–Malyi, Sergei and Nelson, Gordon L., "Experimental Evaluation of Capillary Korona Discharges", American Institute of Aeronautics and Astronautics, 30th Plasmadynamics and Lasers Conference: AIAA–99–3488 (Jun. 28–Jul. 1, 1999), pp. 1–14.

Stark, et al., "Direct Current Glow Discharges in Atmospheric Air", American Institute of Aeronautics and Astronautics, 30th Plasmadynamics and Lasers Conference: AIAA–99–3666 (Jun. 28–Jul. 1, 1999), pp. 1–5.

Babko–Malyi, Sergei, "Ion–drift Reactor Concept", Fuel Processing Technology (1999), pp. 231–246.

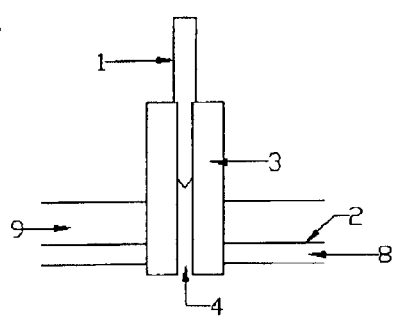
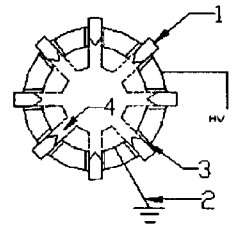
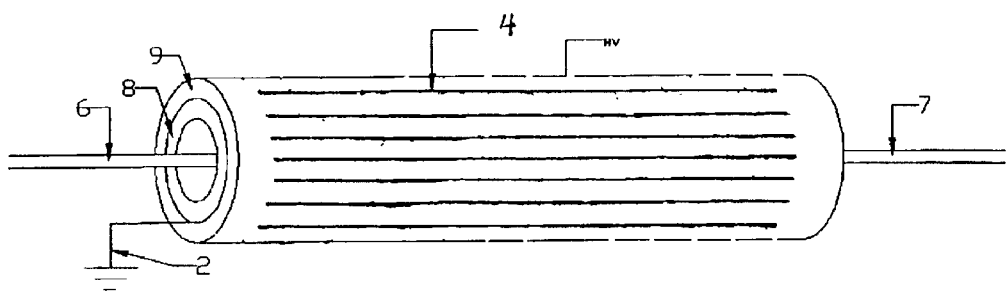
FIG. 4c
FIG. 4b
FIG. 4a

CHEMICAL PROCESSING USING NON-THERMAL DISCHARGE PLASMA

CROSS-REFERENCE TO RELATED APPLICATIONS

This application is a continuation-in-part of U.S. patent application Ser. No. 09/738,923, filed on Dec. 15, 2000, which is hereby incorporated by reference and claims the benefit of U.S. Provisional Application Nos. 60/171,198, filed on Dec. 15, 1999, and 60/171,324, filed on Dec. 21, 1999; and this application claims the benefit of U.S. Provisional Application Nos. 60/309,530, filed on Aug. 2, 2001, and 60/358,340, filed on Feb. 19, 2002, both of which are hereby incorporated by reference in their entirety.

BACKGROUND OF THE INVENTION

1. Field of the Invention

The present invention relates to plasma assisted chemical processing and, in particular to the use of non-thermal capillary discharge plasma (NT-CDP) or a non-thermal slot discharge plasma (NT-SDP) (collectively referred to as "NT-CDP/SDP") to energize specific chemical species in a more homogeneous manner than traditional discharge technologies (e.g., Arc, gliding Arc, Dielectric Barrier Discharge (DBD) and Corona) allowing for higher yield and greater energy efficient chemical conversion. Unlike traditional discharge technologies which tend to create filamentary discharges that are spatially and temporally inhomogeneous a NT-CDP/SDP device generates a diffuse stable plasma with a minimum of volume inefficiencies to help insure equivalent treatment. The NT-CDP/SDP device can also be specifically tuned to selectively initiate certain rate determining chemical reactions, which readily cascade toward the desired product. Adding energy to the system in this specific manner enables chemical reactions to take place under ambient conditions that ordinarily would only be possible at higher temperatures and pressures. Tuning is accomplished by varying: the power, reactant composition and concentration, carrier gas composition and flow rate, temperature, pressure and/or reactor geometry.

2. Description of Related Art

The use of an electrical discharge to initiate chemical reactions of industrial importance has been known and used for a long time. One of the oldest and most efficient chemical transformations that occur in the presence of an electrical discharge is the generation of ozone. The generated ozone may be reacted with unsaturated hydrocarbons to synthesize ozonides, aldehydes, and ketones. Typical early gas discharge devices operate by exposing different reactant gases to an electrical Arc (thermal plasma), as described by Knight, Henry de Boyne, *The arc discharge, its application to power control*, London, Chapman & Hall (1960).

Recent advances have made use of both thermal and non-thermal plasma in chemical processing. U.S. Pat. No. 6,372,192 to Paulauskas et al. describes a process for carbon fiber manufacturing using plasma. In this patented process, stabilized polyacrylonitrile (PAN) fiber, the first step in carbon fiber processing, is converted to carbon graphite fiber using GHz frequency plasma in a low-pressure oxygen free atmosphere. This patent, however, does not disclose or suggest using oxygen rich plasma to stabilize PAN fibers in the initial step of the process.

Research and development in the field of plasma assisted fuel reforming and fuel conversion has also made significant progress in recent years, due predominantly to renewed interest in hydrogen fuel cells. For instance, U.S. Pat. No. 6,322,757 to Cohn et al. and the references cited therein disclose a plasma fuel converter such as a plasmatron to reform hydrocarbons to produce a hydrogen rich gas. U.S. Pat. No. 6,395,197 to Detering et al. describes a high temperature apparatus and method for the thermal conversion of light hydrocarbons (natural gas) to desired end products, particularly diatomic hydrogen and elemental carbon. Yet another patented invention, U.S. Pat. No. 6,375,832 to Eliasson et al., teaches a method for the chemical transformation of a hydrogen (such as methane) and carbon (such as carbon dioxide) rich gas into a normally liquid fuel. This plasma assisted Fischer-Tropsch synthesis is conducted by using a dielectric barrier discharge in conjunction with a solid zeolite catalyst.

Another area of plasma processing that has received significant attention is plasma activated surface treatment of polymeric materials to increase wetability and/or surface adhesion, for example, as described in the publication by L. A. Rosenthal and D. A. Davis entitled "Electrical Characterization of a Corona Discharge for Surface Treatment", IEEE *Transaction on Industry Applications*, vol. 1A-11 No. 3, pp. 328–335 (May/June 1975), the publication by S. Han, Y. Lee, H. Kim, G. Kim, J. Lee, J. Yoon, G. Kim, entitled "Polymer Surface Modification by Plasma Source Ion Implantation", *Surfaces & Coatings Technology*, vol. 93, pp. 261–264 (1997), and U.S. Pat. No. 6,399,159 to Grace et al.

It is therefore desirable to optimize chemical processing through the use of a NT-CDP/SDP, as described in U.S. Pat. No. 09/738,923, filed on Dec. 15, 2000 and 60/358,340, filed on Feb. 19, 2002, each of which are hereby incorporated by reference in their entirety.

SUMMARY OF THE INVENTION

The present invention is directed to a method for enhancing chemical processing. Specifically, the present invention relates to a method for activating chemical reactions using a NT-CDP/SDP unit. The NT-CDP/SDP unit in accordance with the present invention includes a first electrode disposed between two dielectric layers, wherein the first electrode and dielectric layers having at least one opening (e.g., capillary or a slot) defined therethrough. At least one second electrode (e.g., in the shape of a pin, ring, metal wire, or tapered metal blade) is disposed in fluid communication with an associated opening. A non-thermal plasma discharge is emitted from the opening when a voltage differential is applied between the first and second electrodes. Chemical feedstock to be treated is then exposed to the non-thermal plasma. This processing is suited for the following exemplary chemical reactions as (i) partial oxidation of hydrocarbon feedstock to produce functionalized organic compounds; (ii) chemical stabilization of a polymer fiber (e.g., PAN fiber precursor in carbon fiber production); (iii) pre-reforming of higher chain length petroleum hydrocarbons to generate a feedstock suitable for reforming; (iv) natural gas reforming in a chemically reducing atmosphere (e.g., ammonia or urea) to produce carbon monoxide and Hydrogen gas; or (v) plasma enhanced water gas shifting.

BRIEF DESCRIPTION OF THE DRAWINGS

The foregoing and other features of the present invention will be more readily apparent from the following detailed description and drawings of illustrative embodiments of the invention wherein like reference numbers refer to similar elements throughout the similar views and in which:

FIG. 1b is a cross-sectional lateral view perpendicular to the longitudinal axis of the device of FIG. 1a;

FIG. 2b is an enlarged view of a single capillary of the device of FIG. 2a;

FIG. 4a is a side perspective view of an exemplary annular NT-SDP treatment device for the chemical stabilization (oxidation) of a PAN fiber in accordance with the present invention;

FIG. 4b is a cross-sectional lateral view perpendicular to the longitudinal axis of the device of FIG. 4a; and FIG. 4c is an expanded cross-sectional longitudinal view of a single longitudinal wire electrode in the device of FIG. 4b.

DETAILED DESCRIPTION OF THE PRESENT INVENTION

The present invention is directed to a method for activating (catalyzing) chemical reactions. A chemical feedstock exposed to the electrical discharge provided in the plasma volume may improve the yield and/or energy efficiency of a specific chemical transition. Gaseous, liquid, aqueous and/or solid precursors can be treated. Some illustrative types of exemplary chemical reactions that are enhanced when exposed to the NT-CDP/SDP are provided below, wherein each process is accompanied by a specific exemplary reaction:

(i) Partial oxidation of hydrocarbon feedstock to produce functionalized organic compounds, such as alcohols, aldehydes, ketones and carboxcylic acids.

EXAMPLE

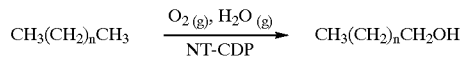

(ii) Chemical stabilization "oxidation" of PAN precursor in route to carbon fiber production.

EXAMPLE

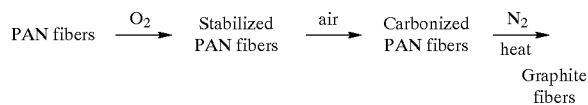

(iii) Pre-reforming ("cracking") of higher chain length petroleum hydrocarbons in order to generate a feedstock suitable for reforming.

EXAMPLE

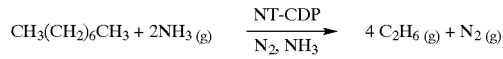

(iv) Natural gas reforming in a chemically reducing (ammonia or urea) atmosphere to produce carbon monoxide and Hydrogen gas.

EXAMPLE

(v) Plasma enhanced water gas shift reaction.

EXAMPLE

In processes (i) and (ii) described above, non-thermal partial oxidation ("cold combustion") of hydrocarbon feedstock is activated using NT-CDP/NT-SDP. The plasma generates the following oxidizing species from ambient air: oxygen atoms (O ($^1$D)), hydroxyl radicals (OH), ozone ($O_3$) and peroxide radicals ($HO_2$) into the gas stream. These highly reactive species then selectively oxidize hydrocarbon molecules to produce the desired product from the reaction. In the case of example (i) the desired outcome is $CH_3(CH_2)_nCH_2OH$.

The reaction described in (iii) above is preferably conducted in a chemically neutral plasma. The term "chemically neutral" refers to environments that have carrier gases that are chemically inert such as (but not limited to) Helium and is the result of direct electron impact dissociation. Process iv) and v), described above, occur preferentially in a chemically reducing plasma, that is a plasma that tends to increase the number of electrons to the target chemicals. (Reduction is the opposite to that of oxidation.) Ammonia or urea may be added to the gas stream to produce an electron rich plasma suitable to enhance the chemical reduction of the hydrogen in methane (process (i)) and water (process (ii)) to hydrogen gas.

Figure 1C:
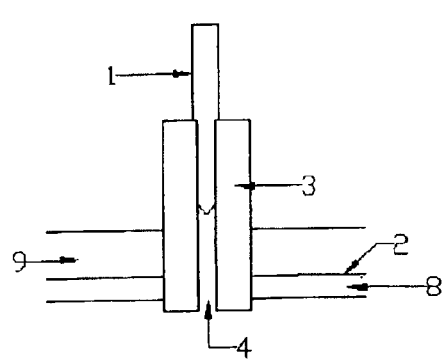
FIG. 1c is an expanded cross-sectional longitudinal view of a single capillary ring electrode in the device of FIG. 1b.
Figure 1B:
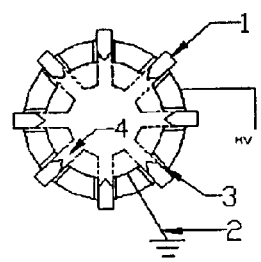
Figure 1A:
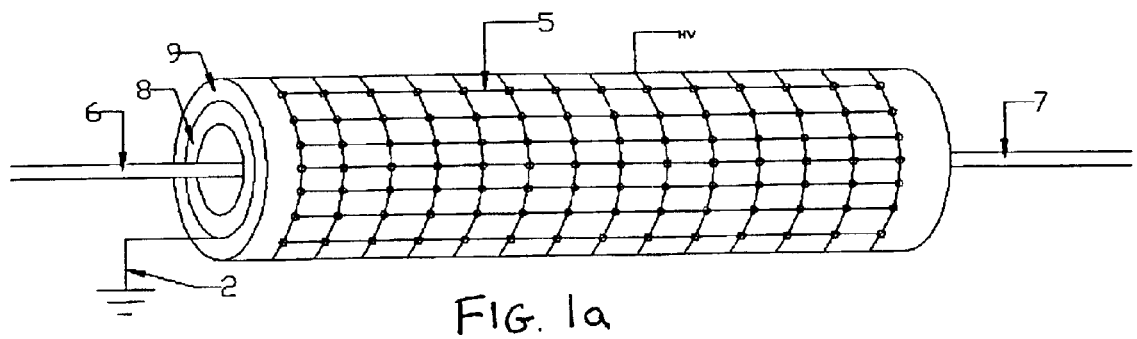
FIG. 1a is a side perspective view of an exemplary annular NT-CDP treatment device for the chemical stabilization (oxidation) of a PAN fiber in accordance with the present invention.

FIGS. 1a-1c show different views of an exemplary annular NT-CDP processing unit that is particularly well suited for the chemical stabilization (oxidation) of polymer fibers such as PAN fibers. The processing unit includes a secondary electrode 2 disposed between two insulating dielectric layers 8, 9 to form a hollow tube. The secondary electrode 2 is selected to have a desired expansion coefficient. Although the processing unit is shown and described as being cylindrical in shape alternative geometric shapes are contemplated and within the scope of the invention. A high voltage bus 5, for example, a wire mesh or an outer metallic sheath, is disposed about the outer dielectric layer 9.

FIG. 1b is a cross-sectional lateral view perpendicular to the longitudinal axis of the processing unit of FIG. 1a. As is clearly shown in FIG. 1b, a plurality of capillaries 4 are preferably defined radially outward through the dielectric layer 8, secondary electrode 2 and opposite dielectric layer 9. A dielectric sleeve 3 made, for example, from quartz, is inserted into each capillary 4 and a pin electrode 1 is embedded in each dielectric sleeve 3 so as to insulate the pin electrode 1 from the secondary electrode 2. The high voltage bus 5 connects the array of pin electrodes 1 to a common high voltage source (HV). In an alternative configuration, the electrode may have a different geometric shape and need not necessarily be embedded in the capillary so long as the electrode is in fluid communication with the capillary. Some alternative configurations of the capillary discharge arrangement are shown and described in U.S. patent application Ser. No. 09/738,923. FIG. 1c is an expanded view of a single capillary shown in FIG. 1b.

In operation, the PAN fiber 6 is received though the channel of the tube and subjected to the NT-CDP generation. While in the processing unit 10 the PAN fiber 6 is subject to the NT-CD plasma discharge and what emerges from the opposite end is a stabilized PAN fiber 7.

Figure 2A:
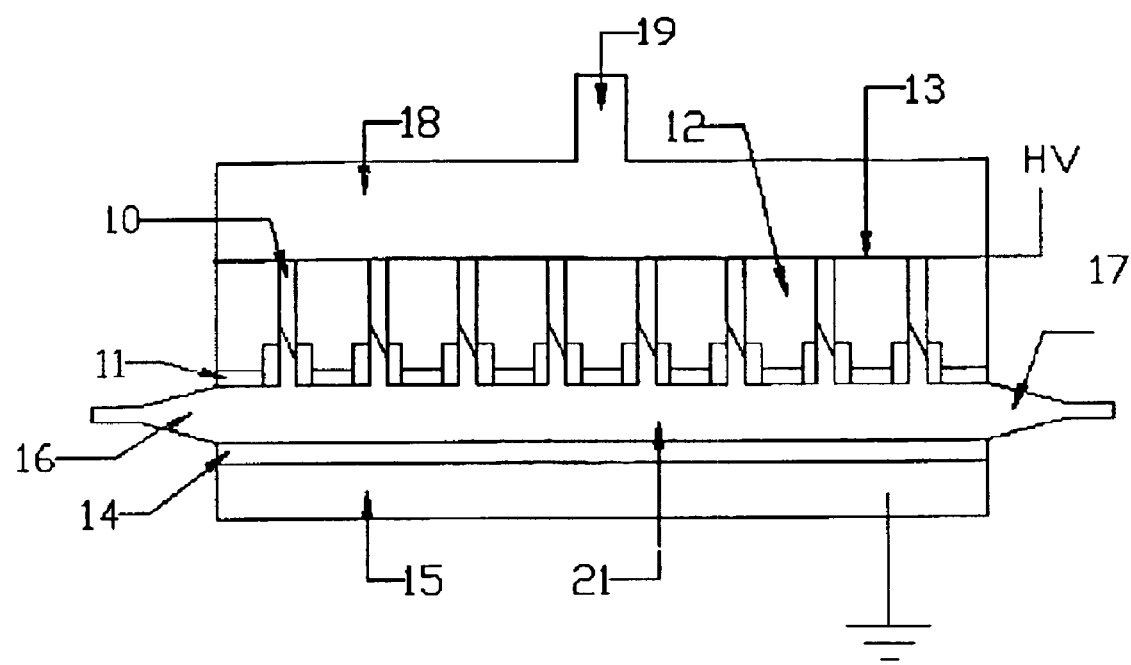
FIG. 2a is a cross-sectional view of an exemplary gas phase NT-CDP assisted chemical processing unit in accordance with the present invention.
Figure 2B:
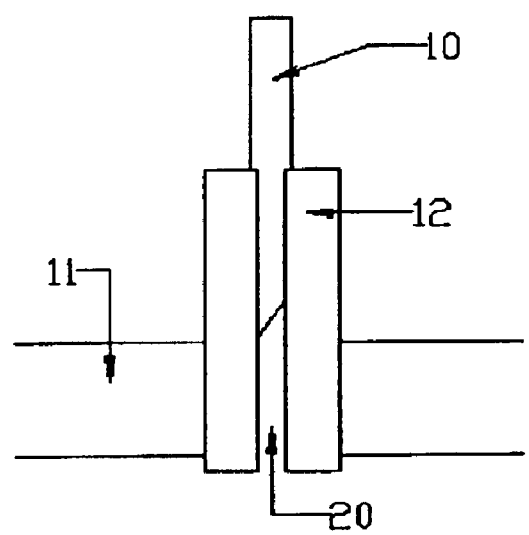

FIGS. 2a and 2b show two views of an NT-CDP gas phase chemical processing unit in accordance with the present invention. Referring to the cross-sectional view in FIG. 2a, a series of capillaries 20 are defined through a dielectric sheet 11. A dielectric sleeve 12 is inserted into each capillary 20 to form a high dielectric current limiting capillary. Embedded in each capillary 20 is a pin or needle electrode 10. Electrically connecting the array of pin or needle electrodes 10 to a common high voltage source is a high voltage bus 13 such as a wire mesh or metallic sheath. A dielectric plate 14 made, for example, from quartz, glass or ceramic, is used to insulate the electrode plate 15. The entrance and exit transitions 16,17, respectively, allow the gas to be processed to pass substantially transverse to the array of capillary plasma jets with the reactor volume 21. A sealed manifold 18 permits gaseous chemical reagents to be ejected into the process stream after passing directly through the plasma jet via the needle electrode 10 and capillary 20. Element 19 is an auxiliary reagent gas entry port. In a preferred embodiment, the system may be readily scaled from a range of approximately 500 watts through approximately 10 KW of plasma power. The processing unit is preferably optimized to use a Radio Frequency power supply. The peak-to-peak voltage required across the reactor gap preferably ranges from approximately 5 KV to approximately 50 KV, depending on the carrier gas.

Figure 3A:
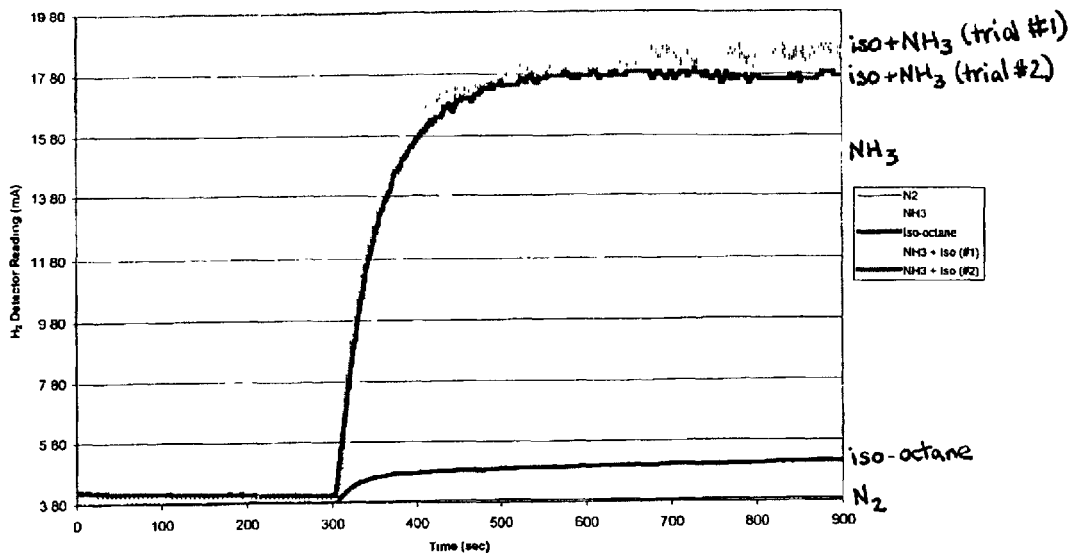
FIG. 3a is an exemplary graphical representation of time versus hydrogen detector reading for the formation of $H_2$ from $NH_3$.
Figure 3B:
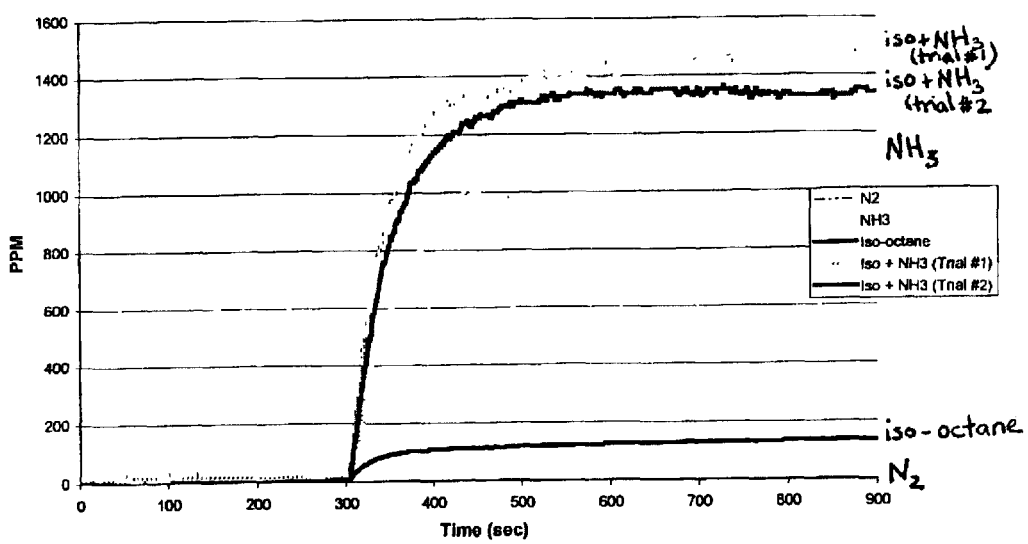
FIG. 3b is an exemplary graphical representation of time versus hydrogen gas concentration.

FIGS. 3a and 3b are experimental graphical results for NT-CDP assisted hydrogen formation from iso-octane and ammonia vapors in nitrogen carrier gas. The discharge was initiated after a 300 second equilibration time to insure a steady state reduction. Specifically, FIG. 3a shows a graphical representation of time versus hydrogen detector reading (mA) during an experiment of the formation of $H_2$ from $NH_3$. The experiment was conducted at a power of 200 W, a concentration of 15M of $NH_4OH$ and at a flow rate of 11 L/min $N_2$. FIG. 3b depicts the graphical results of time versus $H_2$ gas concentration in ppm. This experiment was performed at a power of 2000 W, a concentration of 15M of $NH_{3(aq)}OH$ and at a flow rate of 11 L/min $N_2$ These experimental results establish that little, if any, interference is present due solely to plasma ($N_2$ trace) and only a minimum amount of hydrogen formation from isooctane reforming in chemically neutral plasma (iso-octane trace) when using the NT-CDP configuration in accordance with the present invention. The ammonia trace, shows a significant amount (~1000 ppmV) of hydrogen formation due to the auto-catalytic disproportionation of ammonia. The largest amount of hydrogen (~1500 ppmV) was produced by the synergic effect found when iso-octane is used in the presence of ammonia. GC/MS analysis of the product stream also shows a significant amount of plasma assisted pre-reforming (cracking) in conjunction with this hydrogen formation. These results when optimized may provide a cost effective method of generating hydrogen gas from condensed fuels.

The NT-CDP chemical processing methods in accordance with the present invention are advantageous over conventional thermal and/or catalytic methods in that they significantly lower power consumption and minimizes the depletion of the catalyst over time. The lower power consumption is due to the fact that the bulk gas does not have to be heated in order for the conversion to occur. In addition, NT-CDP chemical processing is also favorable compared with other plasma processes, such as dielectric barrier discharge (DBD) and corona discharge (CD). The reason being that a relatively large volume of diffuse plasma that is realized using NT-CDP allows for substantially homogeneous and efficient chemical processing. The chemical processes disclosed are for illustrative purposes only and are not meant in any way to limit the scope of the present invention to other chemical processing applications.

FIGS. 4a through 4c show an exemplary embodiment of an NT-SDP gas phase chemical processing unit in accordance with the present invention. This embodiment is similar to that shown and described with respect to FIGS. 2a through 2c with the exception that the unit employs a slot discharge configuration instead of a capillary discharge arrangement. The slot discharge configuration in FIGS. 4a-4c is particularly well suited for chemical stabilization of polymer fibers such as PAN fibers. The same reference element numbers denote the same reference elements described with respect to the unit shown in FIGS. 2a-2c. Slots 4 are shown in FIG. 4a as being arranged substantially parallel to the longitudinal axis. Alternatively, the slots 4 may be disposed in a spiral direction or substantially perpendicular to the longitudinal axis of the reactor. An electrode 4 is inserted in each slot. By way of example, the electrode 4 may be a metallic wire arranged to complement the shape of the associated slot and partially inserted, embedded or proximate the slot. In yet another embodiment, the slot may be a tapered blade. Alternative configurations for the slot discharge configuration are described in U.S. Patent Application 60/358,340, which is hereby incorporated by reference in its entirety. This slot discharge configuration exposes a wider surface area of plasma emissions than that of a capillary discharge configuration.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

All of the references, publications and patents referred to herein are each incorporated by reference in their entirety.

What is claimed is:

1. A method for activating chemical reactions using a non-thermal discharge unit that includes a first electrode disposed between two dielectric layers, the first electrode and dielectric layers having at least one opening defined therethrough, and at least one second electrode disposed in fluid communication with an associated opening, the method comprising the steps of:

generating a non-thermal plasma discharge from the opening by applying a voltage differential between the first and second electrodes; and exposing a chemical feedstock to the non-thermal plasma emitted from the opening.

2. The method in accordance with claim 1, wherein the opening is a capillary and the unit further comprises a dielectric sleeve inserted in the capillary.

3. The method in accordance with claim 2, wherein the opening is defined radially outward through the first electrode and dielectric layers.

4. The method in accordance with claim 2, wherein the second electrode is a metal pin or ring.

5. The method in accordance with claim 1, wherein the opening is a slot.

6. The method in accordance with claim 5, wherein the opening is arranged in a longitudinal direction, a spiral direction, or a direction substantially perpendicular to the longitudinal axis.

7. The method in accordance with claim 5, wherein the second electrode is a metal wire or tapered metal blade.

8. The method in accordance with claim 1, further comprising a voltage bus connecting the second electrodes to a voltage source.

9. The method in accordance with claim 8, wherein the voltage bus is one of a wire mesh or a metallic sheath.

10. The method in accordance with claim 1, wherein the chemical reaction is partial oxidation of hydrocarbon feedstock to produce functionalized organic compounds.

11. The method in accordance with claim 1, wherein the chemical reaction is chemical stabilization of a polymer fiber.

12. The method in accordance with claim 11, wherein the polymer fiber is a polyacrylonitrile precursor used in carbon fiber production.

13. The method in accordance with claim 1, wherein the chemical reaction is pre-reforming of higher chain length petroleum hydrocarbons to generate a feedstock suitable for reforming.

14. The method in accordance with claim 1, wherein the chemical reaction is natural gas reforming in a chemically reducing atmosphere to produce carbon monoxide and Hydrogen gas.

15. The method in accordance with claim 14, wherein the chemically reducing atmosphere is ammonia or urea.

16. The method in accordance with claim 1, wherein the chemical reaction is plasma enhanced water gas shifting.

* * * * *

UNITED STATES PATENT AND TRADEMARK OFFICE
CERTIFICATE OF CORRECTION

PATENT NO. : 6,923,890 B2
DATED : August 2, 2005
INVENTOR(S) : Ricatto et al.

It is certified that error appears in the above-identified patent and that said Letters Patent is hereby corrected as shown below:

Column 8,
Lines 6-11, delete claims 11 and 12, and renumber claims 13, 14, 15 and 16 as claims 11, 12, 13 and 14, respectively.

Signed and Sealed this

Thirteenth Day of December, 2005

JON W. DUDAS
*Director of the United States Patent and Trademark Office*